No. 781,745. PATENTED FEB. 7, 1905.
P. SEELIGER.
NEGATIVE POLE PLATE.
APPLICATION FILED JUNE 18, 1903.
3 SHEETS—SHEET 1.
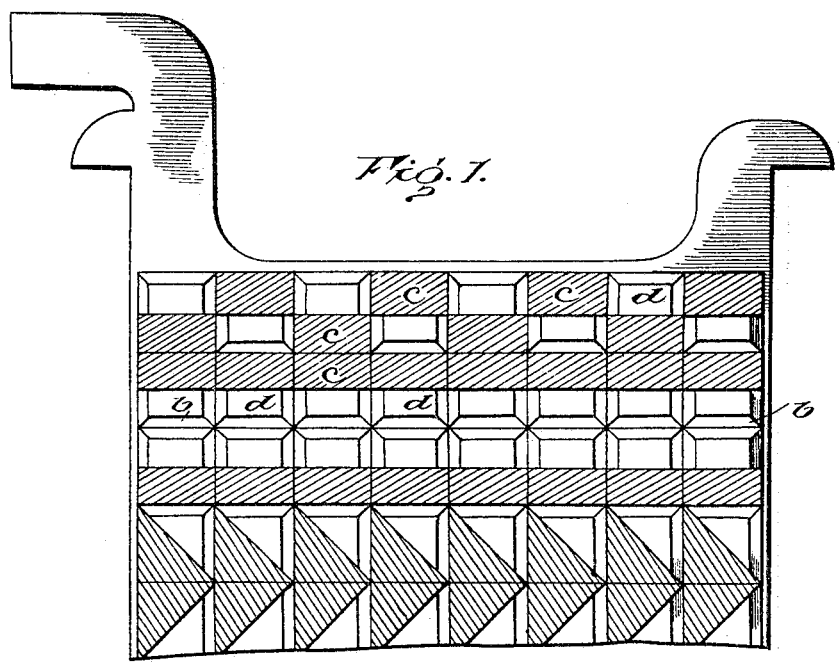
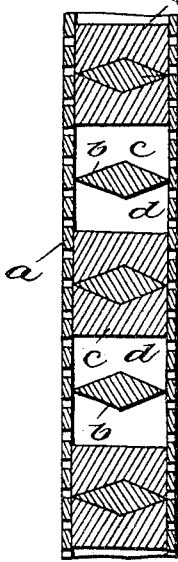 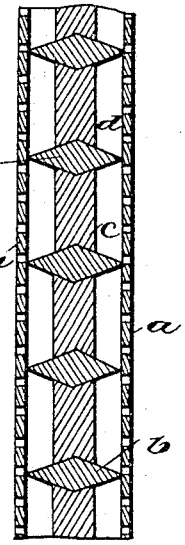 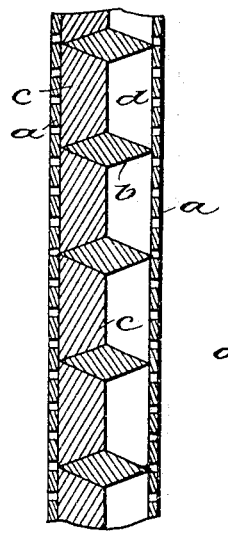 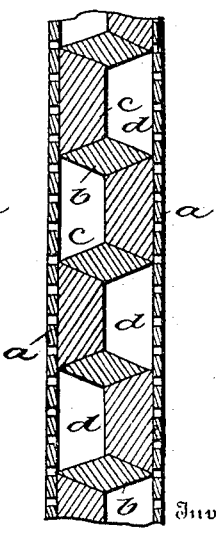
Witnesses
W. A. Williams
John H. Krau
Inventor
Paul Seeliger
By,
Augustus B. Stoughton,
Attorney

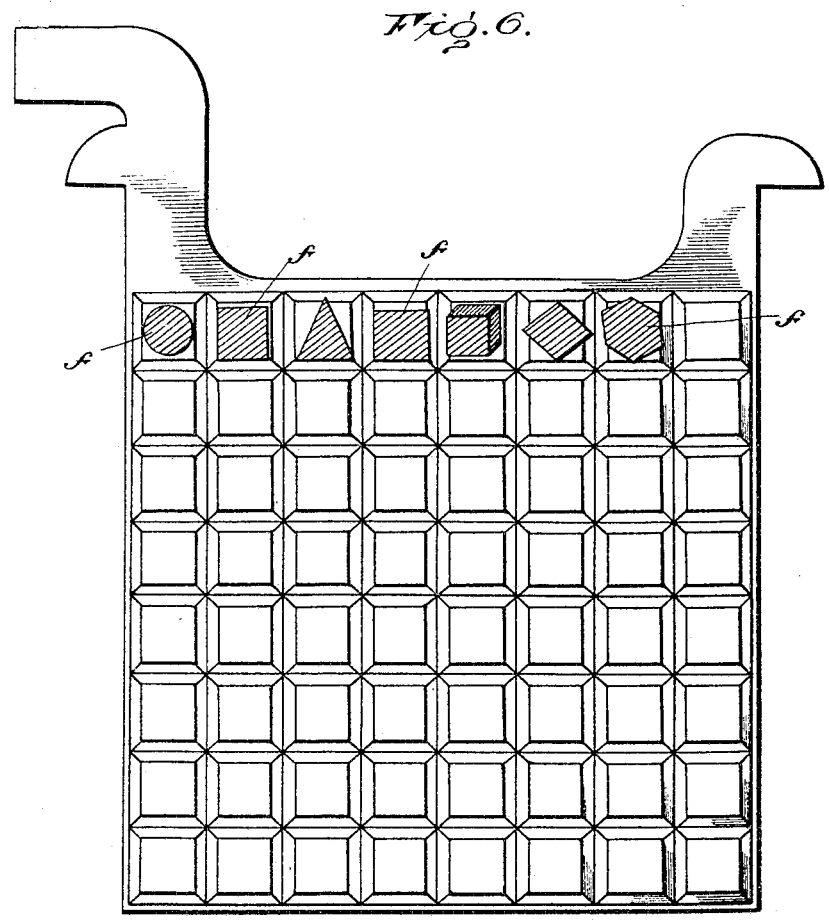

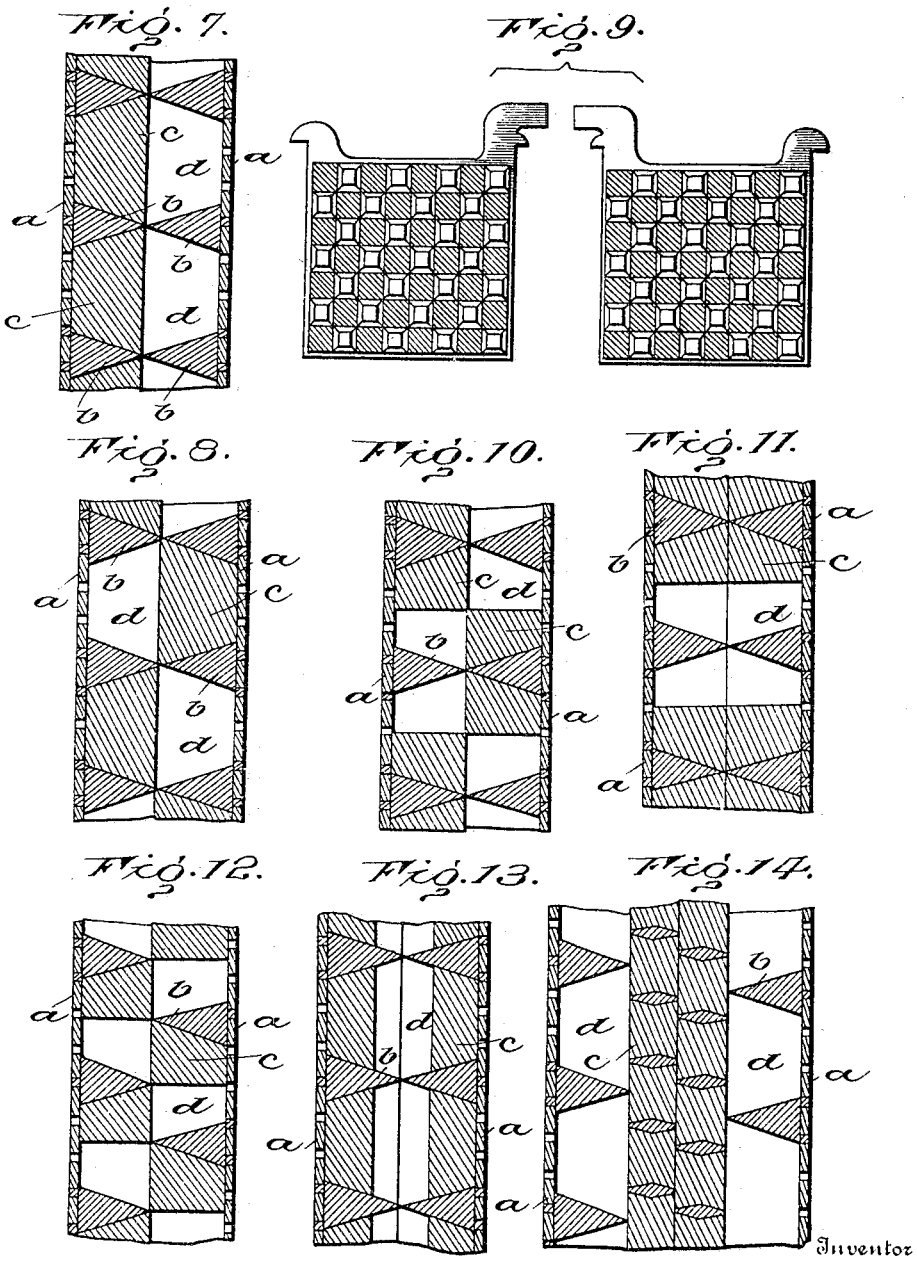

No. 781,745.  
Patented February 7, 1905.

UNITED STATES PATENT OFFICE.

PAUL SEELIGER, OF HAGEN, GERMANY, ASSIGNOR TO ELECTRIC STORAGE BATTERY COMPANY, OF PHILADELPHIA, PENNSYLVANIA, A CORPORATION OF NEW JERSEY.

NEGATIVE-POLE PLATE.

SPECIFICATION forming part of Letters Patent No. 781,745, dated February 7, 1905.

Application filed June 18, 1903. Serial No. 162,036.

*To all whom it may concern:*

Be it known that I, PAUL SEELIGER, a subject of the Emperor of Germany, residing at the city of Hagen, Province of Westphalia, Empire of Germany, have invented a new and useful Negative-Pole Plate, of which the following is a specification.

In the accompanying drawings, Figure 1 is a transverse sectional view of a plate embodying features of the invention. Figs. 2 to 5 are cross-sectional views of plates embodying modifications of the invention. Fig. 6 is a side view of a plate embodying further modifications of the invention. Fig. 7 is a cross-sectional view illustrating another modification. Fig. 8 is a cross-sectional view illustrating a modification of the invention. Fig. 9 is a view illustrating a plate in elevation. Figs. 10 to 14 are cross-sectional views illustrating further modifications of the invention.

In manufacturing negative (sponge-lead) electrodes for accumulators it is known that by adding to active material certain substances themselves chemically inactive or inert the shrinkage of the active material with continued use may be prevented. Examples, but not a complete list of the certain substances referred to as being known, are finely-divided carbon and kaolin or china-clay. If sufficient of this inert material be added, there will occur during the use of the plate an expansion of the active material, which may produce increase of volume, or if there is sufficient porosity the volume may not increase, but the porosity may diminish. In either case there results a disintegration which produces in the mass a loose structure which I have discovered to be especially suitable for use in connection with negative-pole plates and as the active material thereof. The expansion of the mixture may continue until its original volume has been doubled or more, and by this action the loss of capacity of the negative-plates during their life is prevented. The active material so prepared expands outward from the grid, gradually loses contact, and may in a short time all fall off and leave the grid bare. In order to avoid this defect and in accordance with this invention, the spaces of the grids containing such active material are covered or inclosed by perforated plates, retaining-sheets, or grating, as of metal, rubber, or other material comparatively inactive, and the receptacles or spaces of the grid are filled only partly full of active material, so as to leave ample room for future expansion. This partial filling of the receptacles, spaces, or "boxes" of the plate may be done in various ways. To paste, simple grid-plates, templets, or jigs may be used, which fill up the part of the boxes to be left empty and allow the paste to fill only the desired part of the space in the plate.

Figs. 1 to 5 show different ways of carrying this out. Fig. 1 shows a grid with half-filled spaces before being covered with the perforated sheet. Fig. 2 is a somewhat enlarged section of the plate on line $x\, x$, Fig. 1, showing the plate covered on both sides with perforated sheets. The boxes formed by the grid and sheet-covering are half-filled with the described mixture of active and inert material $c$, which in time will expand and be forced by the cover $a$ to grow into the empty space $d$, thus gradually filling up the whole of the box which it occupies. Relative amount of space left for expansion depends upon the percentage of inert substance used, and experiments have shown the best proportions are such as will cause active material approximately to double its original volume, in which case the boxes are to be at first half-filled, as in the drawings.

Figs. 3 to 5 show other ways of partially filling the spaces of a grid-plate when the plate consists of a central grid. It is obvious that many changes of detail may be made without departing from the underlying principles herein set forth. As an instance of such change of detail the plates might be entirely filled with material at first and part of it subsequently removed. It may be partly removed either mechanically, or there may be added to the material soluble matter, which can be removed by solution before the plate is used, thus leaving internal spaces for the material to expand in.

Fig. 6 shows another method of partly filling the plate. There is shown in each box of the plate a pellet or button of active material mixed with the inert substance, but not large enough to fill the whole volume of the box. Perforated covers may be made of lead or other acid-proof material, as hard rubber, and may be fastened on after the filling of the grid in any suitable manner, such as riveting. If two grid-plates are used which are covered on one side with the perforated sheet or net of wire and fastened together after filling, their production is very simple and advantageous. For example, in Fig. 7 the plate consists of two corresponding grids which are covered on one side with a perforated plate $a$, whose ribs $b$ confront each other and of which only the cells of one grid are filled with material $c$, while the cells $d$ of the other grids remain empty. The above application of a mold (jig) is applicable in constructing an electrode-plate in this way. In using the plate the pellets of one grid grow into the cells of the other.

In Fig. 8 the cells of each grid are filled and left empty alternately in such manner that when the plates are united a filled cell on one grid will correspond with an empty cell on the other.

Fig. 9 shows a reduced view of the two plates after filling with material.

Figs. 10 to 13 show several ways in which the desired end may be arrived at by partially filling the cells of each grid, as indicated in Figs. 2 and 3.

In all cases it is not absolutely necessary that the ribs of the grid fit exactly. It is sufficient if the expansion of the material can take place freely in the cells or spaces formed by the two grids, Fig. 12; nor is it necessary that the empty spaces are exactly opposite each other, Fig. 11.

Fig. 14 shows another kind of electrode-plate in which two grid-plates covered on the outside with perforated sheets inclose two ordinary open grids each filled with active material. The material growing there is intended to expand sidewise into the empty compartments of the outer grid. Instead of using two middle grid-plates I may also take one simple plate of contents equal to the two or a plate with a web.

The electrode-plates as shown in Figs. 7 to 14 have the advantage that the perforated sheets of metal can be united with the grids by casting the grids into the sheet before filling the cells with active material, which is simpler and cheaper than fastening the plates or sheets of metal afterward. The union of the grids, Figs. 7 to 14, after the partial filling of the cells is best done by means of oxyhydrogen-blowpipe.

It will be obvious to those skilled in the art to which the invention appertains that modifications may be made in detail without departing from the spirit thereof. Hence I do not limit myself to the precise construction, and arrangement of parts hereinabove set forth, and illustrated in the accompanying drawings; but,

Having thus described the nature and objects of my invention, what I claim as new, and desire to secure by Letters Patent, is—

1. Negative-pole-plate active material possessed of loose structure and being the product derived from expansion and disintegration induced by reducing and discharging a mixture of active and inert materials, substantially as described.

2. A negative-pole plate consisting of the combination of active material of loose structure being the product derived from expansion and disintegration induced by reducing and discharging a mixture of active and inert materials, a support or grid having pockets in which said active material is arranged, and retaining-walls for maintaining proper relation between the support and active material, and provisions for admitting electrolyte to the active material, substantially as described.

3. A negative-pole plate consisting of a mixture of active and inert materials adapted upon reduction and discharge to expand and disintegrate and produce a product being active material of loose structure, and a support or grid having retaining means for holding said active material of loose structure upon its production in proper relation to the support, substantially as described.

4. A negative-pole plate comprising a support operatively combined with active material of loose structure being the product derived from disintegration and expansion induced by reducing and discharging a mixture of active and inert materials, substantially as described.

5. A negative-pole plate consisting of a support or grid having box-like receptacles of which some of the walls are perforated and which are partially filled with a mixture of active and inert materials adapted upon reduction and discharge to disintegrate and expand and produce a product being active material of loose structure which is prevented by said walls from leaving the receptacles, substantially as described.

6. A negative-pole plate consisting of a support having spaces partially filled with a mixture of active material or material adapted to become active and an inert substance which upon reduction and discharge disintegrates and expands and constitutes a product being active material of loose structure which is retained in said spaces, substantially as described.

In testimony whereof I have hereunto signed my name.

PAUL SEELIGER.

In presence of—
  OTTO KÖNIG,
  J. A. RITTERSHAUS.